United States Patent [19]

Shigyo

[11] Patent Number: 5,001,569
[45] Date of Patent: Mar. 19, 1991

[54] IMAGE FILING APPARATUS

[75] Inventor: Masao Shigyo, Kanagawa, Japan

[73] Assignee: Fuji Photo Film Co., Ltd., Kanagawa, Japan

[21] Appl. No.: 530,508

[22] Filed: May 31, 1990

Related U.S. Application Data

[63] Continuation of Ser. No. 67,180, Jun. 29, 1987, abandoned.

[30] Foreign Application Priority Data

Jun. 27, 1986 [JP] Japan .................................. 61-150719

[51] Int. Cl.⁵ .............................................. H04N 1/21
[52] U.S. Cl. .................................................. 358/296
[58] Field of Search ........................ 346/108; 358/296;
250/327.2 A, 484.1, 327.2 B, 327.2 C, 327.2 D

[56] References Cited

U.S. PATENT DOCUMENTS 4,544,956 10/1985 Shimizu ............................... 358/296
4,603,254 7/1986 Takano et al. .
4,672,683 6/1987 Matsueda ............................ 340/799
4,705,953 11/1987 Kimura et al. .
4,768,099 8/1988 Mukai .

Primary Examiner—Mark J. Reinhart
Attorney, Agent, or Firm—Sughrue, Mion, Zinn, Macpeak & Seas

[57] ABSTRACT

An image filing apparatus is constituted for filing image signals on an optical disk, and filing image retrieval signals corresponding to the image signals on a magnetic disk, thereby to construct an image retrieval data base. The image filing apparatus is provided with a system for copying the image retrieval signals back and forth between the magnetic disk and a data base filing optical disk fed to a disk drive unit for operating the optical disk.

4 Claims, 3 Drawing Sheets

IMAGE FILING APPARATUS

This is a continuation of U.S. application Ser. No. 07/067,180 filed on June 29, 1987, now abandoned.

BACKGROUND OF THE INVENTION

1. Field of the Invention

This invention relates to an image filing apparatus for filing image signals on an optical disk, constructing an image retrieval data base on a fixed magnetic disk, and carrying out image retrieval on the basis of the image retrieval data base.

2. Description of the Prior Art

Many medical images have heretofore been utilized for medical treatment or research in, for example, medical facilities such as hospitals. Most of the medical images are radiation images. In recent years, many computed tomography (CT) images, magnetic resonance (MR) images and the like are also utilized.

The medical images should be stored for investigating changes in diseases or injuries of patients, and it is legally stipulated that the medical images be stored for a predetermined period. Therefore, in hospitals or the like, the number of stored medical images increases from day to day. The medical images have heretofore been stored in the form of hard copies. However, storage as hard copies requires a large storage space and burdensome operations for control and retrieval of the medical images in hospitals or the like.

Accordingly, in recent years, it has been proposed to employ an electronic filing method in which medical images are retrievably filed as image signals on a recording medium such as an optical disk. In the case where the medical images are filed in this manner on the recording medium, the space requirement and the burden of image storage are reduced, and the operation of image retrieval becomes easy and quick.

In an image filing apparatus for filing the image signals in the manner as mentioned above, image retrieval signals corresponding to the image signals representing each medical image are filed to construct a data base, and image retrieval is carried out using the data base.

The amount of the image signals representing each medical image is very large, and therefore an optical disk having a very large recording capacity is generally used as the recording medium for filing the image signals. On the other hand, as the recording medium for filing the image retrieval signals corresponding to the image signals representing each medical image, it is advantageous to use a magnetic disk that has a recording capacity smaller than the recording capacity of the optical disk and is suitable for quick retrieval. In this manner, the number of the images capable of being filed on a single optical disk can be increased up to, for example, at least 1,000, and on the other hand, the image retrieval speed can be increased substantially. Also, though the recording capacity of the magnetic disk is smaller than the recording capacity of the optical disk, the amount of the image retrieval signals which are to be filed on the magnetic disk is very much smaller than the amount of the image signals which are to be filed on the optical disk, the image retrieval signals for at least 1,000,000 images for example can be filed on the magnetic disk.

Since it would take several years even in a large hospital before the amount of the image retrieval signals filed on the magnetic disk reaches a value corresponding to 1,000,000 images, a single magnetic disk can be used for that long a period without replacement.

However, fixed magnetic disks readily break when handled incorrectly. Therefore, it may often occur that the magnetic disk breaks in the course of long-term use. If the magnetic disk having the image retrieval signals stored thereon breaks, the image retrieval data base which has been constructed on the magnetic disk is lost. In such a case, even though the image signals are stored on the optical disk, it becomes impossible to re-output the image by retrieval of the image signals, and therefore the image filing apparatus becomes substantially inoperable.

On the other hand, in the course of constructing the image retrieval data base over a long period, it may be required to re-construct a more efficient data base by collecting only specific signals, for example, signals for a specific subject of diagnosis and a specific period. However, such a requirement cannot be satisfied with the data base constructed on the magnetic disk in the manner as mentioned above since the data base is formed by merely storing all the image retrieval signals.

Besides the case of the filing of medical images, the same problems arise in the case where the magnetic disk is used continuously for a long period and an image retrieval data base is constructed on the magnetic disk.

SUMMARY OF THE INVENTION

The primary object of the present invention is to provide an image filing apparatus which prevents loss of an image retrieval data base and which is adapted for expansion or modification of the data base.

Another object of the present invention is to provide an image filing apparatus suitable for efficient image retrieval.

The present invention provides an image filing apparatus for filing image signals on an optical disk, and filing image retrieval signals corresponding to the image signals on a magnetic disk, thereby to construct an image retrieval data base, wherein the improvement comprises the provision of a means for copying said image retrieval signals between said magnetic disk and a data base filing optical disk inserted into a disk drive unit for operating said optical disk.

With the image filing apparatus in accordance with the present invention, the image retrieval data base constructed on the magnetic disk used continuously for a long period can always be backed up by copying it onto the data base filing optical disk. Therefore, even if the magnetic disk should break, image retrieval and image re-output can be achieved by copying the image retrieval data base from the data base filing optical disk to a new magnetic disk. Also, since the image retrieval signals can be copied back and forth between the magnetic disk and the optical disk, it is possible to form data bases classified in accordance with retrieval conditions, and to achieve image retrieval more efficiently.

DESCRIPTION OF THE PREFERRED EMBODIMENTS

The present invention will hereinbelow be described in further detail with reference to the accompanying drawings.

Figure 1:
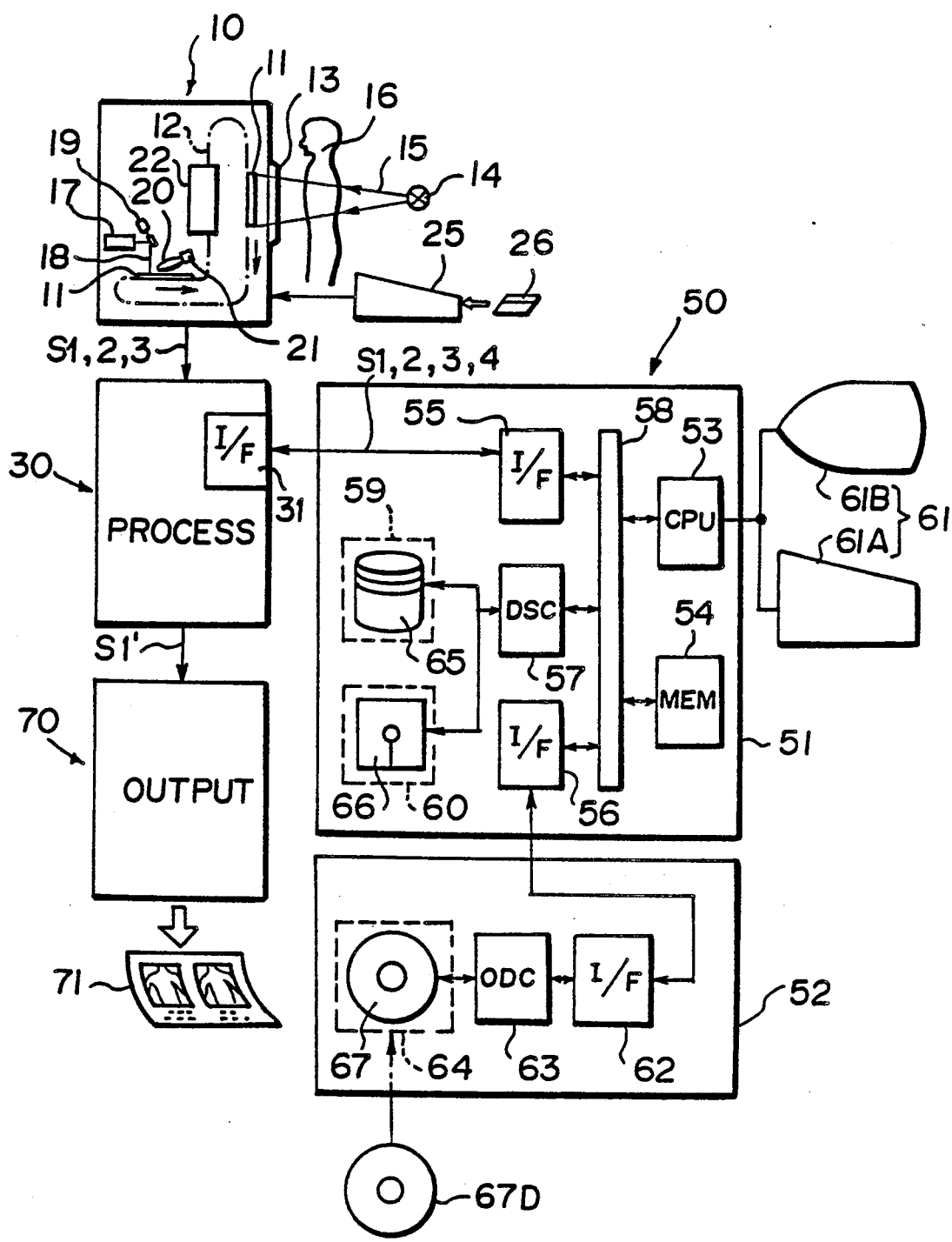
FIG. 1 is a schematic view showing an example of the medical image filing and reproducing system provided with an embodiment of the image filing apparatus in accordance with the present invention.

Referring to FIG. 1, an image filing apparatus 50 is basically constituted by a system control device 51, an optical disk device 52, and an operating console 61 consisting of a keyboard 61A and a display device 61B which may be a cathode ray tube (CRT) or the like. The image filing apparatus 50 is connected to an image processing apparatus 30. The image processing apparatus 30 receives image signals S1 from a radiation image recording and read-out apparatus 10 as an example of an image signal source, carries out a predetermined image processing of the image signals S1, and sends image signals S1' obtained by the image processing to an image output apparatus 70.

The radiation image recording and read-out apparatus 10 may be of the type as disclosed in, for example, Japanese Unexamined Patent Publication No. 61(1986)-29834 or 61(1986)-94035, wherein stimulable phosphor sheets 11, 11 are conveyed and circulated along a circulation path 12, and the stimulable phosphor sheet 11 stopped at the position facing an image recording stand 13 is exposed to a radiation 15 emanated by a radiation source 14 to have an image of an object (patient) 16 stored on the sheet 11. The stimulable phosphor sheet 11 carrying the radiation image stored thereon is conveyed to an image read-out section and two-dimensionally scanned with a laser beam 18 emanated by a laser beam source 17 and deflected by a light deflector 19. As the stimulable phosphor sheet 11 is exposed to the laser beam 18 as stimulating rays, the exposed portion of the sheet 11 emits light in proportion to the stored radiation energy. The emitted light is photoelectrically detected by a photodetector 21 constituted by a photomultiplier or the like via a light guide member 20. The analog output signals of the photodetector 21 are amplified, A/D converted, and output as digital image signals S1 representing the radiation image of the object 16 from the radiation image recording and read-out apparatus 10. After the image read-out is finished in this manner, the stimulable phosphor sheet 11 is sent to an erasing section 22, where the sheet 11 is exposed to erasing light and the radiation energy remaining thereon is erased to such an extent that the sheet 11 is reusable for radiation image recording.

The radiation image recording and read-out apparatus 10 is connected to an ID terminal 25 at which information written on an ID card 26 of the patient 16 (hereinafter referred to as patient information), i.e. the name, sex, date of birth and the like patient information is read out. Also, various conditions with regard to the radiation image recording (hereinafter referred to as image recording information), i.e. the image number, date of image recording, the image recording portion of the object, the image recording size, the read-out sensitivity and the like information is entered at the ID terminal 25. The patient information S2 and the image recording information S3 are fed to the image processing apparatus 30 together with the image signals S1.

The image processing apparatus 30 is constituted so that, for example, not less than 20 types of gradation processings and not less than 10 types of frequency response processings can be effected for the digital image signals S1. The image processing conditions are tabulated, and optimal image processing conditions are automatically selected from the table in accordance with the image recording conditions specified at the ID terminal 25. The image signals S1' obtained by carrying out an image processing by use of optimal conditions in the image processing apparatus 30 are sent to the image output apparatus 70.

By way of example, the image output apparatus 70 is composed of a light beam scanning and recording apparatus for two-dimensionally scanning a photographic film with a light beam modulated with the image signals S1', and an automatic developing machine for developing the exposed film. By the light beam scanning and recording, the image which the image signals S1' represent, i.e. the radiation image of the patient 16, is recorded as a hard copy 71 on the photographic film.

The hard copy 71 of the radiation image formed by use of the photographic film as mentioned above is utilized for diagnosis of the patient 16. Besides the aforesaid configuration, a CRT display device or the like may be used as the image output apparatus 70.

Filing of the radiation image by the image filing apparatus 50 will be described hereinbelow. The system control device 51 of the image filing apparatus 50 is constituted by a known computer system composed of a central processing unit (CPU) 53, a memory 54, interfaces 55 and 56, a disk drive controller 57, a bus 58 for connecting these sections, a fixed magnetic disk drive unit 59, and a floppy magnetic disk drive unit 60. The aforesaid keyboard 61A and the display device 61B are connected to the CPU 53, and the interface 55 is connected to an interface 31 of the image processing apparatus 30. The optical disk device 52 is composed of an interface 62 connected to the interface 56 of the system control device 51, an optical disk drive controller 63, and an optical disk drive unit 64.

The aforesaid patient information S2 and the image recording information S3 are transferred from the image processing apparatus 30 to the system control device 51, and sequentially recorded on a magnetic disk 65 operated by the magnetic disk drive unit 59, thereby to construct a data base. A floppy disk 66 operated by the floppy disk drive unit 60 is utilized for control of system operation. The patient information S2 and the image recording information S3 are also transferred to the optical disk device 52, and filed on an optical disk 67 operated by the optical disk drive unit 64 together with the image signals S1 transferred from the image processing apparatus 30. At this time, the image signals S1 bypass the image processing section in the image processing apparatus 30, and are recorded on the optical disk 67 as raw signals which have not been subjected to the image processing.

Figure 2:
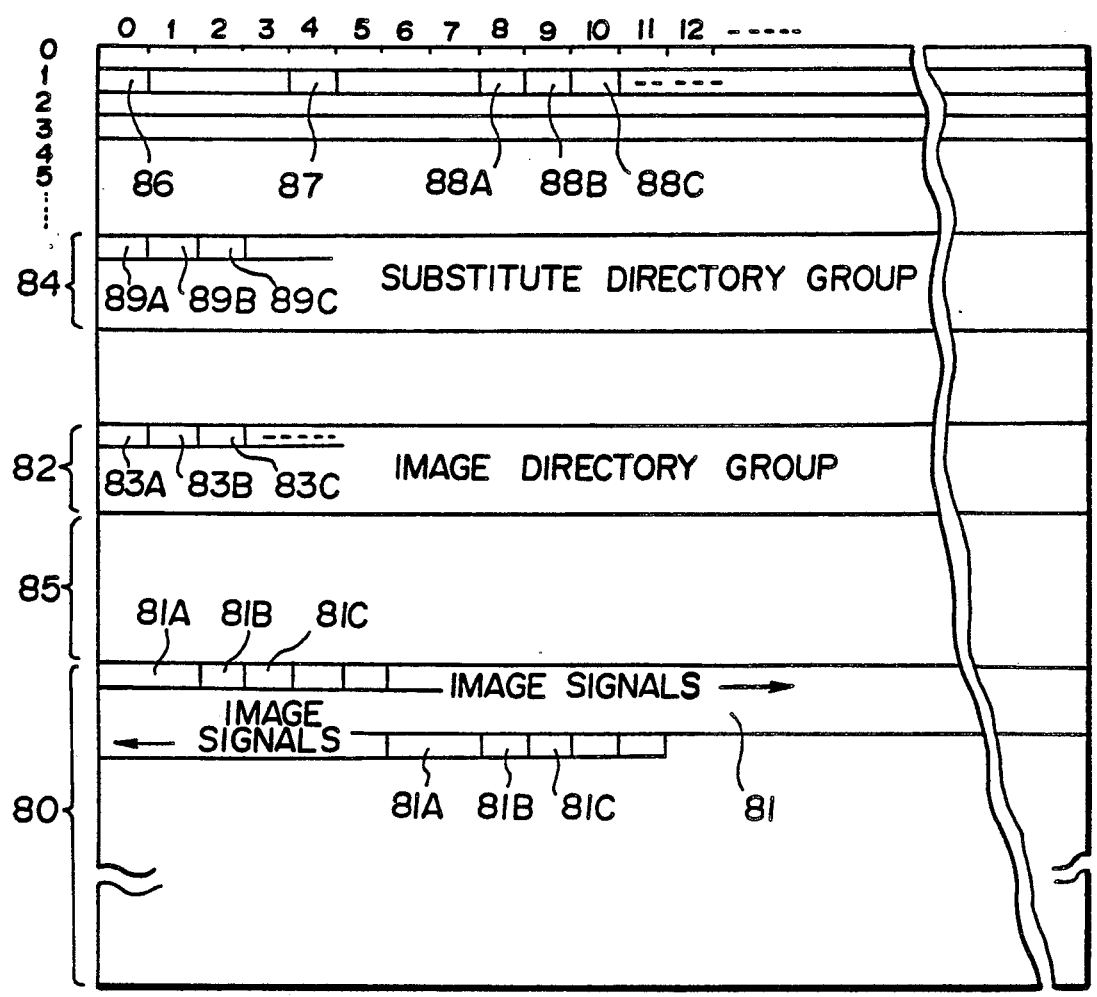
FIGS. 2 and 3 are explanatory views showing the recording formats of an image signal filing optical disk and an image retrieval data base filing optical disk used in the image filing apparatus shown in FIG. 1.

Recording of the image signals S1, the patient information S2, and the image recording information S3 on the optical disk 67 will now be described in detail with reference to FIG. 2 showing the recording format of the optical disk 67. In FIG. 2, each graduation along the vertical axis indicates a single track on the optical disk 67, and each graduation along the horizontal axis indicates a single sector. The image signals S1 are recorded in units of a single image in an image signal recording region 80 which is sufficiently broadly formed on the optical disk 67. As is well known, signal recording is effected based on formation of pits in the surface of the optical disk 67. A header 81A where the patient information S2 and the image recording information S3 corresponding to the image signals S1 representing a single image in an image signal area 81 are to be recorded, and blocks 81B and 81C where signals S4 representing the image processing conditions for use in the image processing apparatus 30 are to be recorded are disposed before and after the image signal area 81 for the single image. These image processing conditions are identical with the image processing conditions which were used for processing the image signals S1 in the image processing apparatus 30 in the course of reproducing the images by immediately sending the image signals S1 to the image output apparatus 70.

When the image signals S1 have been recorded in the image signal area 81 on the optical disk 67 in the manner as mentioned above, one of the image directories 83A, 83B, 83C, . . . that corresponds to the image signals S1 in the image signal area 81 is recorded in an image directory region 82. Basically, in each of the image directories 83A, 83B, 83C, . . . , the head address of the header 81A for the image signals S1 in the image signal area 81, the sector length of the image signals S1 in the image signal area 81, and characteristic information on the image signals S1 in the image signal area 81 are recorded.

Besides the image signal recording region 80 and the image directory region 82, the optical disk 67 is also provided with a region 84 for forming substitution directories 89A, 89B, 89C, . . . used for substitution of the image directories 83A, 83B, 83C, . . . when they are changed, and a region 85 for forming directories of new recorded signals representing information on a diagnosis card or the like. Also, on the first track of the optical disk 67, there are formed a block 86 where the serial number of each optical disk 67 and a disk surface identification code are to be recorded, a block 87 for indication of the full status of the optical disk 67, and a plurality of directory entry blocks 88A, 88B, 88C, . . . . The first directory entry block 88A is used for indicating that a group of the image directories 83A, 83B, 83C, . . . has been formed. The head address and the sector length of the image directory group (i.e. the group of directories formed in the image directory region 82) are recorded in the first directory entry block 88A. In the second directory entry block 88B, the head address and the sector length of the substitution directory group (89A, 89B, 89C, . . . ) are recorded. Also, the third directory entry block 88C and the subsequent directory entry blocks are formed for recording head addresses and sector lengths of directory groups for the future.

In the manner as mentioned above, the image signals S1 are sequentially recorded in units of a single image on the optical disk 67, and the patient information S2, the image recording information S3, and the image processing condition signals S4 are sequentially recorded thereon in conformity with the image signals S1 representing each image. In order to increase the number of images capable of being filed on the optical disk 67, the image signals S1 should preferably be compressed by a known image signal compression technique before being recorded on the optical disk 67. Though very large amounts of the image signals S1 are recorded on the optical disk 67 in addition to the patient information S2 and the image recording information S3, approximately 1,000 images can be filed on a single optical disk 67 when an image signal compression technique is applied. On the other hand, the recording capacity of the magnetic disk 65 is smaller than the recording capacity of the optical disk 67. However, only the patient information S2 and the image recording information S3 are recorded on the magnetic disk 65, and therefore the patient information S2 and the image recording information S3 on approximately 1,000,000 images, for example, can be filed thereon.

Image retrieval and re-output will now be described below. As mentioned above, the data base for image retrieval has been constructed by the patient information S2 and the image recording information S3 filed on the magnetic disk 65. An image retrieval operator operates the keyboard 61A to enter the desired retrieval information, using the display device 61B of the operating console 61. The system control device 51 retrieves images corresponding to the entered retrieval information from the data base constructed on the magnetic disk 65, and displays a list of the images on the display device 61B. Basically, as the retrieval information, all items of the patient information S2 and the image recording information S3 can be used. For example, when of the patient information S2 the name of a patient is designated as the retrieval information, an image list indicating the image numbers of all images of the designated patient, the patient information S2 other than the name of the patient, and the image recording information S3 are displayed on the display device 61B. The retrieval operator selects a desired image from the displayed image list, and reserves the re-output of the image. The reserved image number is stored in the memory 54. In this manner, the image retrieval operation can be completed in advance even though the image processing apparatus 30 and the image output apparatus 70 are in operation for immediately reproducing an image by use of the image signals S1 received from the radiation image recording and read-out apparatus 10. Also, even if the image to be retrieved is one recorded on an optical disk different from the optical disk 67 that is in the optical disk device 52 at the time of the image retrieval operation, without the retrieval operation carried out as mentioned above becoming invalid, image re-output can be started subsequently by leading the optical disk device 52 with the optical disk carrying the reserved image recorded thereon after the aforesaid reservation was carried out.

When information indicating the cessation of the operation of the image processing apparatus 30 is entered into the system control device 51 after the aforesaid reservation, the system control device 51 activates the optical disk device 52 to read out the image signals representing the reserved image from the optical disk 67. In the course of the image signal read-out, an instruction for read-out of the image directory group in the region 82 is given with the first directory entry block 88A acting as a pointer, and the image directories 83A, 83B, 83C, . . . are read out. Also, one of the image directories 83A, 83B, 83C, . . . in which the reserved image number is written acts as a pointer, and the header 81A indicated by said image directory is designated. In this manner, the information written in the header 81A, the image signals S1 written in the image signal area 81, and the information written in the blocks 81B and 81C corresponding to the header 81A are read out.

The image signals S1 in the image signal area 81, the patient information S2 and the image recording information S3 in the header 81A, and the signals S4 representing the image processing conditions in the blocks 81B and 81C, which have been read out in the manner as mentioned above, are transferred from the system control device 51 to the image processing apparatus 30.

The image signals S1 are subjected in the image processing apparatus 30 to an image processing such as a gradation processing or a frequency response processing by use of the image processing conditions which the aforesaid signals S4 represent, and the processed image signals S1' are sent to the image output apparatus 70. In the image output apparatus 70, the image is reproduced in the same manner as mentioned above by use of the processed image signals S1', and a hard copy 71 of the radiation image is formed. The patient information S2 and the image recording information S3 are utilized for writing the patient information and the image recording information on the hard copy 71.

Copying of the image retrieval data base filed on the magnetic disk 65 to an optical disk will now be described below. An optical disk drive unit 64 of the system control device 51 is capable of being loaded with a data base filing optical disk 67D of the same type as the optical disk 67 for recording the image signals S1. When an instruction to copy the data base is given, such as by selection of a batch copy mode via the keyboard 61A, the CPU 53 of the system control device 51 copies the image retrieval signals (i.e. the aforesaid patient information S2 and the image recording information S3) from the magnetic disk 65 to the data base filing optical disk 67D on the basis of a predetermined program. As mentioned above, the image retrieval signals for not less than approximately 1,000,000 images can be filed on the magnetic disk 65. Therefore, a single magnetic disk 65 can be continuously used over several years even in a very large hospital. In the course of such a long period, copying of the image retrieval signals is carried out at appropriate time intervals, for example monthly.

Figure 3:
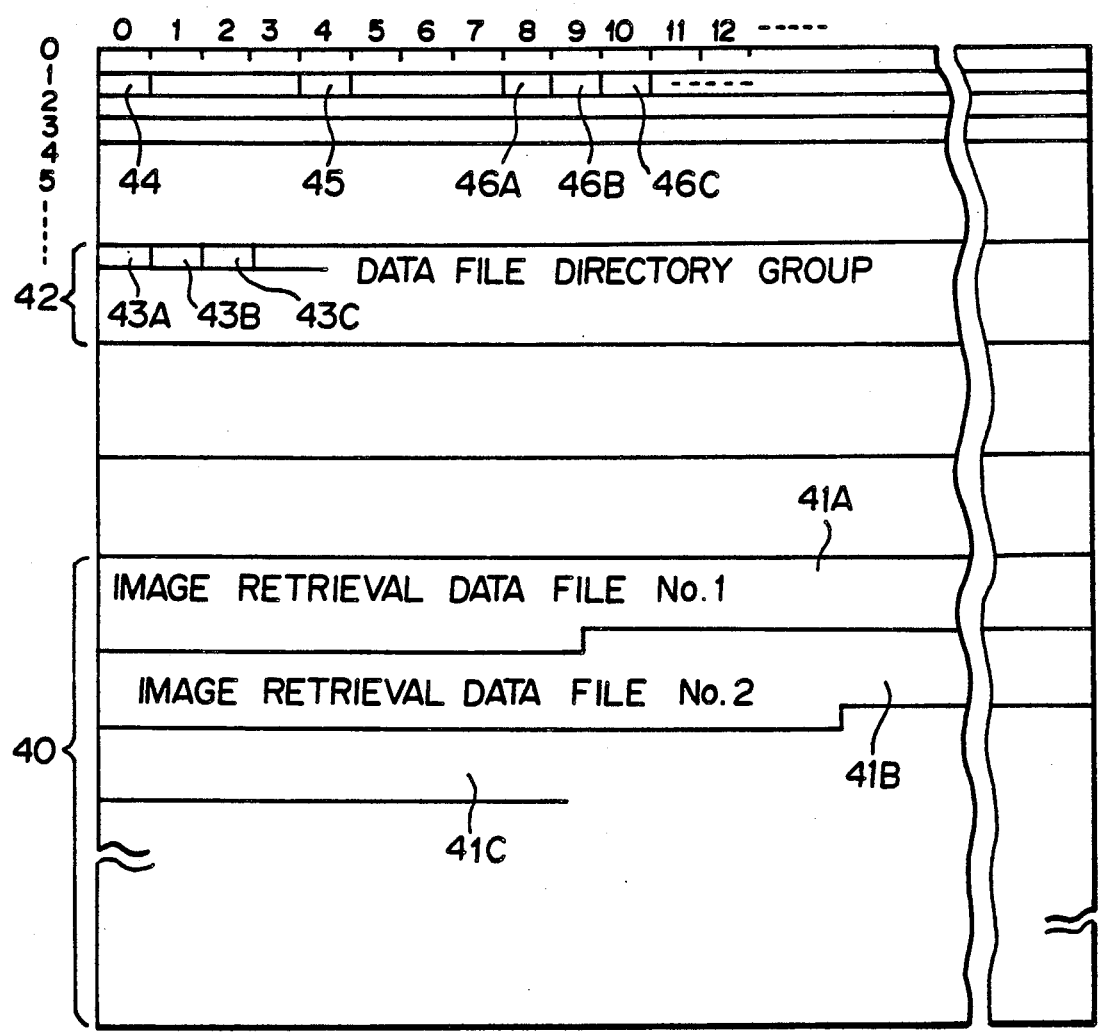

Recording of the image retrieval signals on the data base filing optical disk 67D will hereinbelow be described with reference to FIG. 3. As in FIG. 2, FIG. 3 schematically shows the recording format of the data base filing optical disk 67D. The image retrieval signals read out from the magnetic disk 65 are recorded by each copying operation in an image retrieval signal recording region 40 formed on the data base filing optical disk 67D. Each time signal copying is effected, data files of the image retrieval signals are sequentially recorded on data file page 1, data file page 2, data file page 3, and so on in the image retrieval signal recording region 40. When data files 41A, 41B, 41C, . . . have been recorded on the data base filing optical disk 67D in this manner, data file directories 43A, 43B, 43C, . . . corresponding to the data files 41A, 41B, 41C, . . . are recorded one after another on a data file directory region 42. Basically, head addresses and file sector lengths of the data files 41A, 41B, 41C, . . . are recorded respectively as the data file directories 43A, 43B, 43C, . . . . Also, as in the case of the aforesaid image signal filing optical disk 67, on the first track of the data base filing optical disk 67D, there are formed a block 44 where the serial number of each optical disk 67D and a disk surface identification code are to be recorded, a block 45 for indication of the full status of the optical disk 67D, and many directory entry blocks 46A, 46B, 46C, . . . . The first directory entry block 46A is used for indicating that a group of the data file directories 43A, 43B, 43C, . . . has been formed. The head address and the sector length of the data file directory group are recorded in the first directory entry block 46A. Also, the second directory entry block 46B, the third directory entry block 46C and the subsequent directory entry blocks are formed for recording head addresses and sector lengths of new directory groups which will be formed when necessary in the future.

In the manner as mentioned above, the same data base as the image retrieval data base constructed on the magnetic disk 65 is filed on the data base filing optical disk 67D. Therefore, in the case of breakage of the magnetic disk 65, the image retrieval data base which was constructed prior to the breakage of the magnetic disk 65 can be reproduced on a new magnetic disk 65 by copying back the image retrieval signals from the data base filing optical disk 67D to the new magnetic disk 65. This copying back of the image retrieval signals will now be described below in detail. The optical disk drive unit 64 is loaded with the data base filing optical disk 67D, the number of one of the data files 41A, 41B, 41C, . . . is specified from the keyboard 61A, and an instruction to copy back the image retrieval signals is issued. Then, the CPU 53 of the system control device 51 reads out the specified data files 41A, 41B, 41C, . . . from the data base filing optical disk 67D, and records the read-out signals on the new magnetic disk 65. As would be understood from the foregoing descriptions, the image retrieval signals which were stored on the previous magnetic disk 65 at the time of breakage of the magnetic disk 65 are recorded in the data file 41 having the largest number. (Strictly speaking, the image retrieval signals filed on the previous magnetic disk 65 between the time when the data base was copied to the data base filing optical disk 67D and the time when the magnetic disk 65 broke are not included in this case.) Therefore, normally, the instruction to copy back the data file 41 having the largest number is issued.

In the manner mentioned above, the image retrieval signals are copied back from the data base filing optical disk 67D to the new magnetic disk 65. Accordingly, the data base filed on the previous magnetic disk 65 can be reproduced almost intact on the new magnetic disk 65, and image retrieval can be achieved as before for re-output of the radiation images.

Besides the copying of the image retrieval data base in the same form from the magnetic disk 65 to the data base filing optical disk 67D, a retrieval and copy mode, for example, may be selected via the keyboard 61A, and an instruction to copy the data base may be issued. In this case, the CPU 53 carries out the ordinary image retrieval, and on the data base filing optical disk 67D stores only the image retrieval signals of the images which are listed by the image retrieval. Specifically, when a subject of diagnosis as one item of the patient information is specified by way of example as the image retrieval signals, all images corresponding to the specified subject of diagnosis are listed. When the data base copying instruction is given from the keyboard 61A, the image retrieval signals for the listed images are recorded on the data base filing optical disk 67D. Therefore, in this case, data files 41A, 41B, 41C, . . . can be formed for the respective retrieval conditions such as the subject of diagnosis.

In copying back the image retrieval signals filed on the data base filing optical disk 67D to the magnetic disk 65, the copying to the magnetic disk 65 can be done by retrieval condition, such as the subject of diagnosis, by specifying via the keyboard 61A the data file 41 which is to be copied. Therefore, in this case, when the image retrieval signals are copied back to the magnetic disk 65 having a comparatively small capacity, a data base which can be retrieved quickly is newly constructed. It is also possible to store the image retrieval signals on the data base filing optical disk 67D by classifying them into different files by data, in order to erase all of the image retrieval signals stored on the magnetic disk 65 being used continuously over a long period and then copy back to the magnetic disk 65 those image retrieval signals other than old ones which are no longer needed for retrieval. In this case, the data base filed on the magnetic disk 65 used continuously can be renewed from time to time, and image retrieval can be carried out no efficiently.

The system control device 51 should preferably be constituted so that it can carry out image retrieval on the basis of the image retrieval data base on the magnetic disk 65 in the manner as mentioned above and can carry out image retrieval on the basis of the image retrieval data base filed on the data base filing optical disk 67D inserted into the optical disk drive unit 64. In this case, in the course of carrying out image retrieval by utilization of the image retrieval data bases constructed for the respective retrieval conditions as mentioned above, it becomes unnecessary to prepare a magnetic disk 65 for the copying back of the image retrieval data bases for the respective retrieval conditions.

Though the aforesaid embodiment is applied to the case where a radiation image is the type of medical image filed, the image filing apparatus in accordance with the present invention is also applicable to the case where the medical images such as CT images and MR images are to be filed, and the case where images other than medical images are to be filed.

I claim:

1. An image filing apparatus for filing image signals on an optical disk, and filing only image retrieval signals corresponding to the image signals on a magnetic disk, thereby to construct an image retrieval data base, wherein the improvement comprises means for copying said image retrieval signals from said magnetic disk to a data base filing optical disk and from said data base filing optical disk to said magnetic disk, said data base filing optical disk being loaded into a disk drive unit for operating said data base filing optical disk.

2. An apparatus as defined in claim 1, further comprising means for carrying out image retrieval on the basis of the image retrieval signals filed on said data base filing optical disk.

3. An apparatus as defined in claim 1 wherein said image signals represent a medical image.

4. An apparatus as defined in claim 3 wherein said medical image is a radiation image, and said image signals representing said radiation image are digital image signals obtained by photoelectrically detecting said radiation image stored on a stimulable phosphor sheet.

* * * * *